United States Patent [19]

Kong

[11] Patent Number: 4,829,572
[45] Date of Patent: May 9, 1989

[54] SPEECH RECOGNITION SYSTEM

[75] Inventor: King-Leung Kong, Happy Valley, Hong Kong

[73] Assignee: Andrew Ho Chung, Hong Kong

[21] Appl. No.: 117,485

[22] Filed: Nov. 5, 1987

[51] Int. Cl.[4] .............................................. G10L 7/08
[52] U.S. Cl. ...................................... 381/41; 381/43; 381/45; 364/513.5
[58] Field of Search .................................... 381/41–50; 364/513.5

[56]   References Cited
U.S. PATENT DOCUMENTS

| | | | |
|---|---|---|---|
| 3,909,532 | 9/1975 | Rabiner et al. | 381/41 |
| 3,978,287 | 8/1976 | Fletcher et al. | 381/41 X |
| 4,519,094 | 5/1985 | Brown | 381/43 |
| 4,716,593 | 12/1987 | Hirai et al. | 381/43 X |

Primary Examiner—Patrick R. Salce
Assistant Examiner—Emanuel Todd Voeltz
Attorney, Agent, or Firm—Fitch, Even, Tabin & Flannery

[57] ABSTRACT

The present invention provides a system for recognizing speech in which a profile is constructed of a related characteristic of each significant phoneme in a language. A difference profile is generated for each pair of significant phonemes by subtracting the profile of each phoneme from the profile of each other phoneme. Adjacent sections of each difference profile which exceed positive and negative thresholds are identified. The likelihood that an unknown phoneme will be one or the other of a phoneme pair based on the relative areas in the identified sections of the difference profile is computed. An equivalent profile is constructed of a phoneme of an unknown utterance. The most likely phoneme of each phoneme pair is chosen based on the relative areas in the identified sections of the profile of the unknown phonemes.

55 Claims, 5 Drawing Sheets

SPEECH RECOGNITION SYSTEM

BACKGROUND OF THE INVENTION

The present invention relates to a method and apparatus for the computerized recognition of speech.

Many attempts have been made to develop a computer data base which would allow the computer to understand human speech. Early attempts at computerized speech recognition tried to represent a speech window of approximately 10–20 milliseconds by using a fast Fourier transform, or a similar technique such as linear predictive coefficients. A data bank consisting of templates (acquired averages) of the transform coefficients of known speech parameters was developed. Unknown speech elements were compared with the various templates in an attempt to recognize what was said.

Such early attempts to perform speech recognition were generally failures. One problem was that the templates would incorporate all of the aspects of the known utterance, and would fail to discriminate relevant from irrelevant information. The templates would generally contain so much irrelevant information that the relevant and useful information was essentially buried. Also, the templates could be confused by changes in the tempo of the speech, which occurs even for the same speaker. In addition, these techniques assume a constant frequency distribution for the entire time window. It has been found that the speech pattern changes significantly during the period of the window, which blurs the data when averages are computed and seriously degrades its utility.

More recent attempts at speech recognition have focused on features of the speech which distinguish one spoken utterance from another. One example is to identify sounds by their change in frequency rather than their base frequency. This represents a significant improvement over earlier techniques, because there is less irrelevant information incorporated into templates which are based on frequency change. However, ferreting out identifiable features on the templates which are useful in discriminating one sound from another has been difficult. Also, such techniques generally use a Fourier transform to identify the frequency change. Such a Fourier transform still assumes constant characteristics over a period of time which do not exist.

Speech recognition has succeeded in certain very limited and controlled environments. For example, a voice pattern analysis can be performed which can recognize a known speaker, but such devices do not recognize actual speech. Also, devices have been constructed which can recognize commands in a limited vocabulary spoken slowly and distinctly, in the absence of ambient noise. However, no computerized system has come close to the speech recognition capabilities of the human body, and none has general utility.

SUMMARY OF THE INVENTION

The present invention provides a system for recognizing speech in which a profile is constructed of a related characteristic of each significant phoneme in a language. A difference profile is generated for each pair of significant phonemes by subtracting the profile of each phoneme from the profile of each other phoneme. Sections of each difference profile which exceeds positive and negative thresholds are identified. The likelihood that an unknown phoneme will be one or the other of a phoneme pair based on the relative areas in the identified sections of the difference profile is computed. Sections that best discriminate phoneme pairs are retained and used for recognition. An equivalent profile is constructed of a phoneme of an unknown utterance. The most likely phoneme of each phoneme pair is chosen based on the relative areas in the identified sections of the profile of the unkown phoneme.

The system of the present invention focuses on the characteristic differences between phonemes, rather than the individual characteristics of each phoneme. By analyzing difference data rather than basic data, the present invention avoids to a large extent the problem inherent in prior systems.

The present invention includes a hardware system for processing the spoken utterances to develop specific characteristic profiles by which the speech can be recognized. An energy spectrum—and both up- and down-sweep spectra—are derived. It is from these spectra that the most significant characteristics of the phoneme are identified. The profiles can include separate energy and sweep profiles based on short and long time constants to further develop the most significant characteristics of each phoneme.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
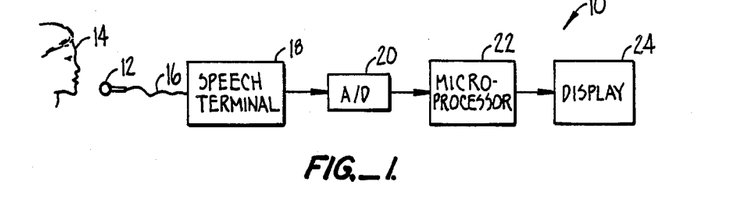
FIG. 1 is a block diagram showing the basic elements of the preferred embodiments of the present invention.

The basic components of the preferred embodiment 10 of the present invention are illustrated generally by way of reference to FIG. 1. A microphone 12 is used to receive voice input from an speaker 14. Microphone 12 has a transducer which converts the sonic speech energy into an analog electric signal. The analog electric signal passes through wires 16 to a speech terminal 18, which is illustrated in more detail in FIG. 2.

Speech terminal 18 derives a plurality of profiles which are characteristic of the phonemes found in the speech input. A "phoneme" is the smallest unit of speech that will distinguish one utterance or word from another, and each syllable generally consists of a pair of phonemes. For example, the word "mat" consists of two phonemes, the "ma" sound which distinguishes "mat" from "bat", and the "at" sound which distinguishes "mat" from "map". The profiles for each utterance are digitized in analog to digital convertor 20 and input to microprocessor 22, which has a display 24.

Embodiment 10 is used first to train microprocessor 22 by having the individual 14 repeat known phonemes. Speech terminal 18 develops profiles based on these known phonemes, which are digitized on convertor 20 and used to develop a data base for the phonemes in microprocessor 22. Embodiment 10 is then used the recognize unknown speech uttered by individual 14 by comparing equivalent profiles generated with respect to the phonemes of the unknown speech with probability distributions based on the profiles for the known phonemes, in a process described in detail below. Display 24 is used to assist in building words based on the detected phonemes and in selecting from alternative phonemes to identify words which the microprocessor has not been able to adequately discriminate.

Figure 2:
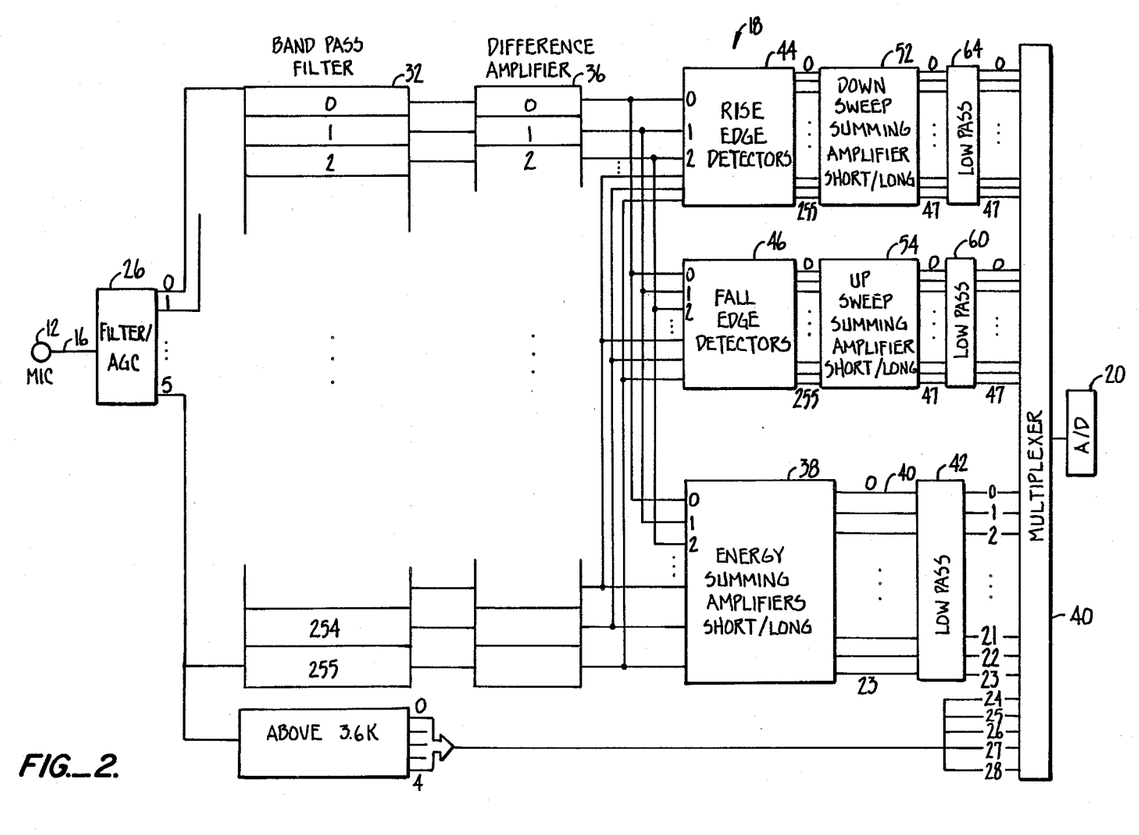
FIG. 2 is a block diagram of the speech processing system of the preferred embodiment.
Figure 3:
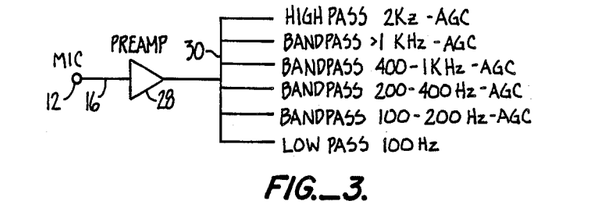
FIG. 3 is a schematic view of the automatic gain control system of the preferred embodiment.

Speech terminal 18 is illustrated in more detail in the schematic of FIG. 2. The analog electric signal representing the spoken utterance is carried on wire 16 from the transducer in microphone 12 to a filter and automatic gain control unit 26. Gain unit 26 is described in more detail in FIG. 3, and includes a preamplifier 28 and a series of bandpass filters 30. The preamplified signal is divided into 6 frequency regions, the lowest being frequencies below 100 Hz, the highest being frequencies above 2 Kz, and the rest in between. The output of each filter 30 is independently passed through a separate automatic gain control tailored to each frequency region. The gain control attack time constant is optimized for each frequency region, with faster attack times used on the higher frequencies. Applying the automatic gain control separately to each frequency region substantially reduces the problem of spectral tilt which is found in other processing systems.

A sequency 32 of 256 lowpass filters, designated by the numbers 0-255, is located downstream of filter/gain control unit 26, and receives the output of that unit. In addition. a spearate set of bandpass filters 34 receives and separates input frequencies above 3.6 Kz into five discrete high frequency regions. The output of filters 32 (but not filters 34) is input to a series of 256 difference amplifiers 36, which each generate an electrical signal having a magnitude which indicates the relative amount of energy in each frequency range.

Slow and fast energy summing amplifiers 38 receive the output signals of difference amplifiers 36. Energy summing amplifiers 38 sum the output signal of difference amplifiers 36 for a sequence of time intervals. A short time constant energy spectrum and a long time constant energy spectrum are each generated. Both the short and long time constant energy spectra utilize a sequence of time intervals which are within the duration of a single phoneme. However, the short time constant energy spectrum is generated by summing a sequence of time intervals which is short relative to the long time constant energy spectra. The long time constant energy spectrum is generated by summing a sequence of short time constant energy spectra within the duration of a single phoneme, rather than processing the raw data twice. The long and short time constant energy spectra represent different characteristics of the phoneme for any phoneme whose energy characteristics change with time, and each may be useful in discriminating a given phomeme from any other phoneme, as discussed hereinafter. Each energy spectrum is output on 24 parallel lines 40, processed by lowpass filters 42 to smooth the profile, and passed to multiplexor 44.

The short and long time constant energy spectra for a single phoneme include not only the output of energy summing amplifiers 38, but also the direct input from the high frequency regions isolated by high frequency filters 34. The complete short and long time constant energy spectra are represented by the 24 line output signals of lowpass filters 42, and the 5 line output signals of high frequency filters 34.

Figure 4:
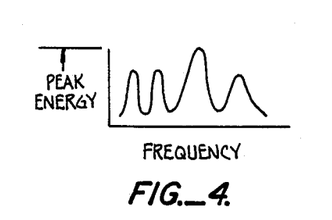
FIG. 4 is a representative energy spectrum computed by the preferred embodiment of the present invention.
Figure 5:
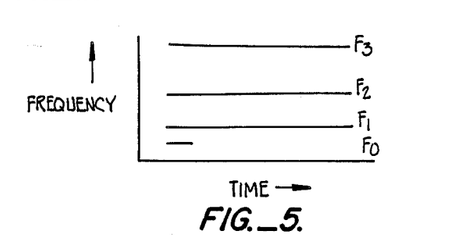
FIG. 5 is a graphic depiction of the formants of a constant frequency phoneme.

A representative energy spectrum generated by the apparatus of FIG. 2 is illustrated in FIG. 4, based upon a phoneme having the frequency characteristics of FIG. 5. FIG. 5 illustrates the frequency characteristics of a phoneme in which the frequencies remain essentially constant with time. In FIG. 5, the phoneme has its energy concentrated at essentially four discrete frequencies, called formants, resulting in a frequency distribution with four peaks, as illustrated in FIG. 4. This frequency distribution is characteristic of the particular phoneme in question, and will be different for different phonemes.

The short time constant spectrum is more sensitive, reaching saturation readily, and is suitable for detecting phonemes with short and intense bursts of energy (e.g., p,t,k). The long time constant spectrum has a wider dynamic range in intensity response, reaching saturation more slowly, and is more suitable for longer duration phonemes with saturated moderate level energy, i.e., the monophthongs.

Figure 6:
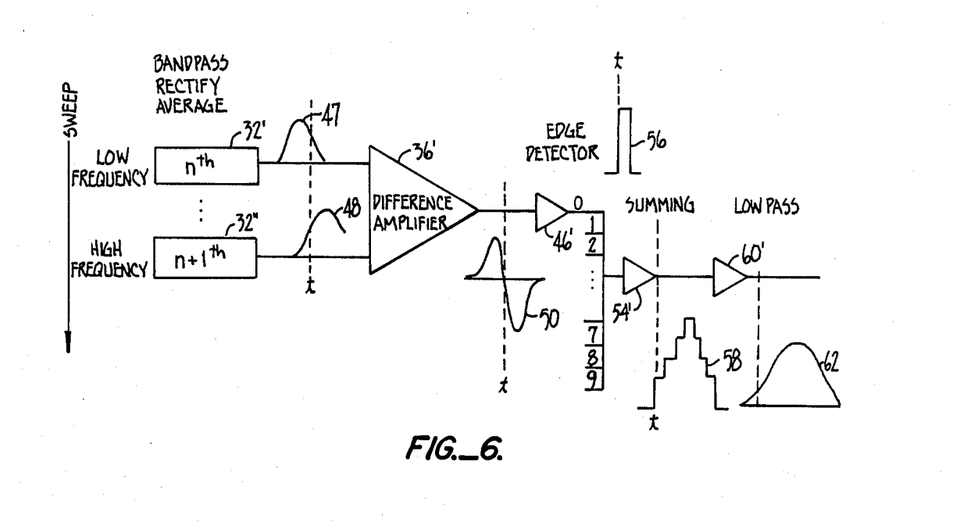
FIG. 6 is a schematic view of the band pass filter and edge detector system illustrated in FIG. 2.

Referring still to FIG. 2, the output signals of difference amplifiers 36 are also input to a set of rise edge detectors 44, and a set of fall edge detectors 46. The operation of a single fall edge detector 46' is illustrated in FIG. 6 (the operation of the rise edge detectors is complementary). Rise edge detector 46' receives its input from the output of difference amplifier 36', which in turn reveives its input from adjacent bandpass filters 32' and 32''.

Figure 7:
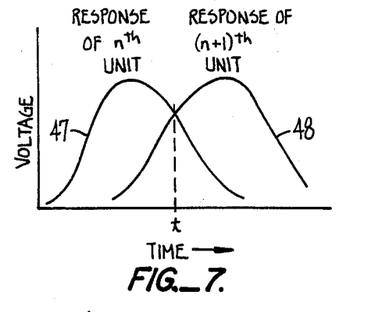
FIG. 7 is a graphic depiction of the output of adjacent band pass filters shown in FIG. 6.
Figure 8:
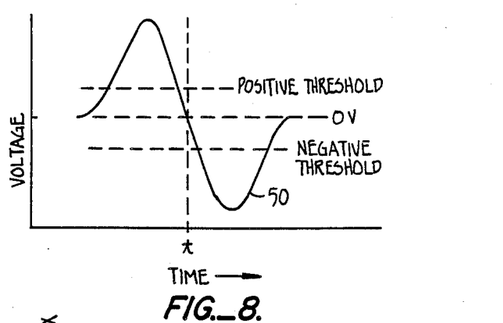
FIG. 8 is a graphic depiction of the output of the difference amplifier of FIG. 6.

FIG. 6 illustrates a situation in which the frequency characteristics of the phoneme are changing with time so that the frequency in which energy is concentrated is rising, i.e. the energy peak is moving up the frequency scale with time. The peak output of the "n+1" filter 32" will be thus displaced later in time from that of the "n" filter 32', as illustrated by relative curves 47, 48 (See FIG. 7). As a result, the output of difference amplifier 36' will have the configuration shown in curve 50 (See FIG. 8), with a rise to a positive value, then a quick drop through zero to a negative value, and then back to zero. The rise in frequency through the bandpasses represented by filters 32' and 32", therefore, will result in the output of the difference amplifier 36 having a sharp fall, or negative transition, through zero.

Edge detector 46' as a "fall" edge detector, will detect the negative transition represented by curve 50 if (a) the rate of fall is within certain time limits established by the characteristics of the detector, and (b) the size of the transition from positive to negative above a certain threshold established by the characteristics of the detector. The characteristics of the edge detector are significant because the formant transitions of different phonemes vary in their rate, direction and extend. Each edge detector, such as 46", provides a rectangular wave output of fixed amplitude and duration, as illustrated by curve 56, when it detects a falling edge. Rise edge detectors 44 have characteristics similar to those of the fall edge detectors 46, except that they detect positive transitions, which result when the frequency of the energy concentrations is decreasing.

A representative upsweep summing amplifier 54' is illustrated in FIG. 6. Each upsweep summing amplifier 54' receives input signals from 10 adjacent edge detectors such as edge detector 46'. There are 48 upsweep summing amplifiers, each having 10 inputs, and only 256 fall edge detectors, so the edge detectors which input to a particular summing amplifier overlap. As a frequency sweep occurs over the plurality of bandwidths established by filters 32, the summing amplifier 54' will add the various outputs of the edge detectors and output a stepped curve, as illustrated at 58. This output is passed through the associated lowpass filter 60', one of 48 lowpass filters 60 porcessing the output of the 48 umsweep summing amplifiers 54, to obtain a smooth curve 62. Similarly, the output signals of downsweep summing amplifiers 52 are processed by 48 lowpass filters 64.

The output signals of lowpass filters 60, 64 comprise the upsweep and downsweep spectra computed by the apparatus of FIG. 2 for a particular point in time. These spectra are representative of the phoneme being processed. The spectra are output to multiplexor 44. The energy, upsweep and downsweep spectra are each digitized by analog and digital convertor 20, and input to microprocessor 22 (see FIG. 1).

Figure 9A:
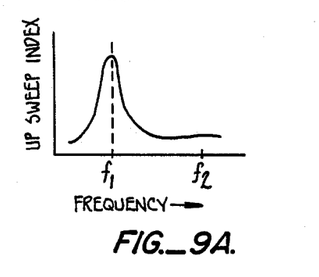
FIGS. 9A and B are graphic depictions of the output of the up-sweep and down-sweep detection respectively of the apparatus of FIG. 2 for a phoneme having the frequency change characteristics illustrated in FIG. 10.
Figure 9B:
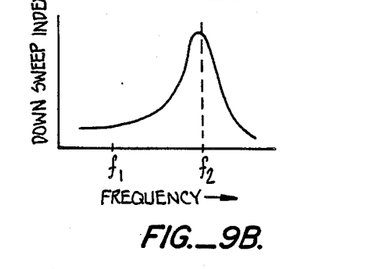
Figure 10:
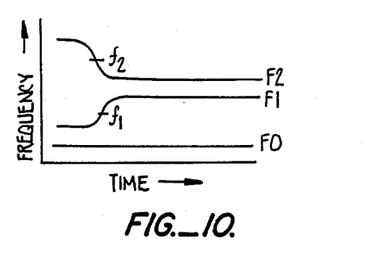
FIG. 10 is a graphic depiction of the formants of a variable frequency phoneme.

The upsweep and downsweep spectra for a phoneme having the frequency characteristics illustrated in FIG. 10 are shown in FIGS. 9A and 9B respectively. One of the formants (F1) of the phoneme depicted in FIG. 10 undergoes an increase infrequency centered on frequency $f_1$, while another formand (F2) undergoes a decrease in frequency centered around frequency $f_2$. The upsweep spectrum, illustrated in FIG. 9A, shows a substantial rise in the upsweep index centered around frequency $f_1$, with no change in the frequency at $f_2$. Conversely, the downsweep spectrum shown in FIG. 9B shows a substantial rise in the index centered around frequency $f_2$, with no change in the index at $f_1$. The plot of the upsweep index versus the frequency of FIG. 9A, and the plot of downsweep index versus the frequency of FIG. 9B, thus represent upsweep and downsweep profiles respectively which are characteristic of the phoneme having the frequency characteristics represented in FIG. 10. As with the energy spectra illustrated previously, the upsweep and downsweep spectra can be generated with short and lont time constants to characterize different aspects of the phoneme being represented.

Figure 17A:
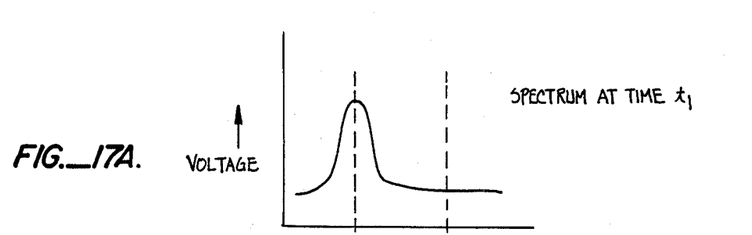
FIGS. 17A-C are a sequence of graphic depictions of the combining of spectra over a time sequence.
Figure 17B:
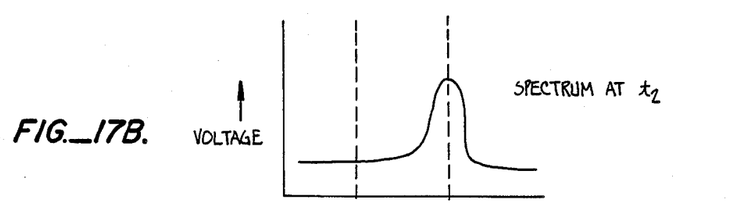
Figure 17C:
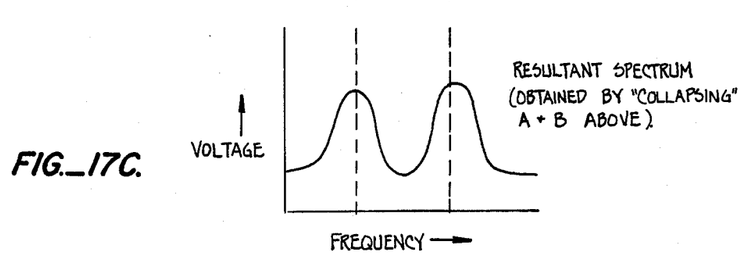

For each type of energy or sweep spectrum, a time series of spectra is generated for each phoneme uttered. A single spectrum is derived from each time series by retaining for each spectral channel the maximum value obtained for that channel within the phoneme's duration. For example, two spectra obtained at times t1 (FIG. 17A) and t2 (FIG. 17B) will result in that in FIG. 17C.

FIG. 4 represents an energy spectrum, which is one type of profile that is characteristic of a particular phoneme. FIGS. 9A and 9B illustrate sweep spectra, which are other profiles characteristic of a particular phoneme. Each of the spectra is itself characterized by peaks and valleys. The present invention, rather than using the peaks and valleys of the spectra by themselves to identify the unknown phoneme, uses a comparison of characteristic peaks from equivalent spectra of different phonemes.

Figure 11:
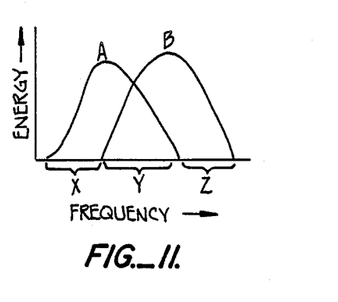
FIG. 11 is a graphic depiction of superimposed output of the apparatus of FIG. 2 from different phonemes.

As an elemental example, in FIG. 11 two peaks from corresponding energy spectra for phonemes A and B are represented. With the present invention, the area present in the region labeled "Y" is of no interest, because both phonemes have concentrations in this region and the areas are roughly equal. The present invention concentrates its attention on region X, where only phoneme A has energy, and region Z, where only phoneme B has energy.

Figure 12:
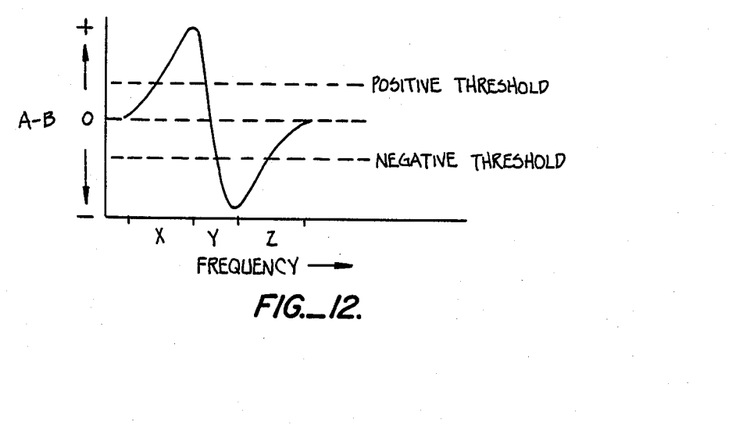
FIG. 12 is a graphic depiction of a difference spectrum corresponding to the output illustrated in FIG. 11.

To identify significant characteristics by which phoneme A can be distinguished from phoneme B, the difference spectrum shown in FIG. 12 is generated by subtracting the spectrum of phoneme B from that of phoneme A. The section labeled "X", where only phoneme A has a contribution, shows as a significant positive peak, rising above a positive threshold established empirically. Correspondingly, the difference spectra has a significant negative value in the area designated "Z" resulting from the contribution from phoneme B, which exceeds a negative threshold. It has been found that this difference spectrum is far less sensitive to noise than the raw spectra themselves, and in addition focuses only on signifcant differences between pairs of phonemes, ignoring areas in which they are the same.

Figure 13:
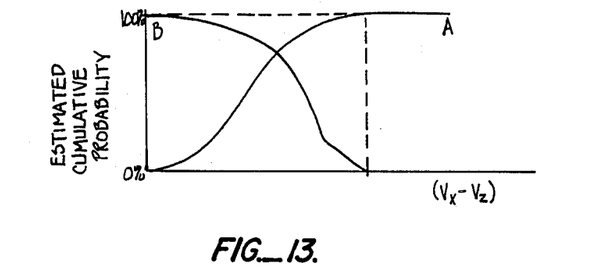
FIG. 13 is a graphic depiction of a probability distribution based on the characteristics illustrated in FIGS. 11 and 12.

After areas of significance such as X and Z in FIG. 11 have been determined, a computation is made of the probability distribution of the "B-ness" and "A-ness" of a unknown utterance. As represented in FIG. 13, probability is plotted as a function of $A_x-A_z$, representing the difference between the amount of areas in the X region and that in the Z region. This probability distribution is generated empirically once the X and Z areas have been identified.

Figure 14:
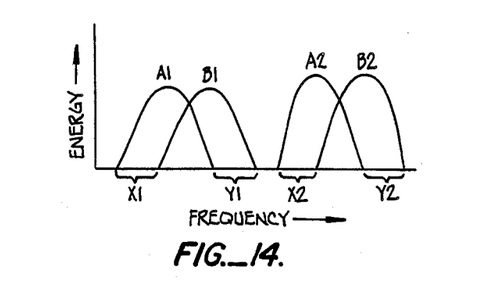
FIG. 14 is a graphic depiction of the profiles of two features for a pair of phonemes.
Figure 15:
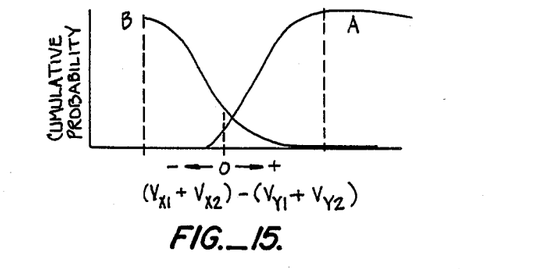
FIG. 15 is a graphic depiction of a probability distribution based on the profile of FIG. 4.
Figure 16:
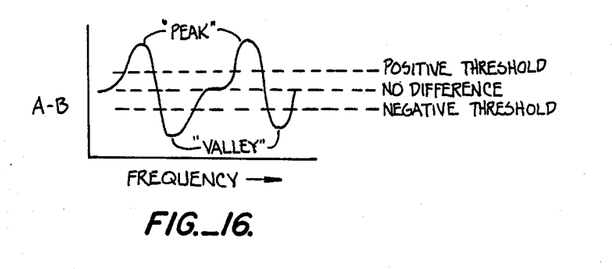
FIG. 16 is a graphic depiction of a difference profile generated from the pair of profiles represented in FIG. 14.

As represented in FIG. 14, for each phoneme pair there may be several sets of peaks which are of interest. In FIG. 14, phoneme A has peaks A1 and A2, while phoneme B has peaks B1 and B2. As represented in FIG. 16, the difference profile constructed by subtracting the spectrum for phoneme B from that of phoneme A indicates a pair of peaks and valleys. In the present invention, adjacent peaks and valleys are identified as indicative of "features" by which phonemes A and B can be distinguished from one another. A probability distribution is computed for each peak/valley set, as illustrated in FIG. 13. The distributions are normalized and combined so that each contribution will have equal weight, as illustrated in FIG. 15. The relative probability of an unknown phoneme being A and B is determined by comparing the relative area in the identified sections with the probability distribution of FIG. 15.

In operation, the apparatus illustrated in FIG. 2 is used to construct a plurality of spectra, as illustrated in FIGS. 4 and 9A and B, which are profiles representative of a known phoneme. Once such profiles have been computed for the most common phonemes, herein designated as "significant" phonemes (a collection of data on all possible phonemes is impractical), difference profiles are generated in which each spectra for each phoneme is differenced with the equivalent spectra of each other phoneme. Areas of significant difference are isolated, and probability distributions are generated based on the comparison of energy in the areas of significance. By comparing the integrated areas in the regions of significance with the probability distributions for each phoneme pair, the most likely phonemes can be identified by combining the results of each comparison. A dictionary in the microprocessor is used to generate the most likely words from the identified phonemes. The most likely words are placed on display 24, where the operator can correct any obvious errors and complete the speech recognition process.

While a preferred embodiment of the present invention has been illustrated in detail, it is apparent that modifications and adaptations of that embodiment will occur to those skilled in the art. For example, the analog system of FIG. 2 could be replaced with a completely digitial system. However, it is to be expressly understood that such modifications and adaptations are within the spirit and scope of the present invention, as set forth in the following claims.

What is claimed is:

1. A method for recognizing speech containing a plurality of significant phonemes, said method comprising the steps of:
   constructing a profile of a characteristic of each significant phoneme;
   generating a difference profile for substantially each pair of significant phonemes by subtracting the profile of each significant phoneme from the profile of each other significant phoneme;
   identifying adjacent sections of each difference profile which exceed positive and negative thresholds respectively;
   computing the likelihood that an unknown phoneme will be one or the other of a phoneme pair based on the relative areas in the identified sections of the difference profile;
   constructing an equivalent profile of a phoneme of an unknown utterance; and
   choosing the more likely phoneme of each phoneme pair based onthe relative areas in the identified sections of the profile of the unknown phoneme.

2. The method of claim 1 wherein the profile constructing step comprises detecting the frequency distribution of the energy of a known utterance for a plurality of time intervals within the duration of a single phoneme, and deriving at least one energy spectrum representing the peak energy present in the phoneme as a function of frequency for a plurality of frequency distributions covering a sequence of time intervals, and wherein the difference profile generating step includes generating a difference profile for substantially each pair of significant phonemes by subtracting the energy spectrum of each significant phoneme from the energy spectrum of each other significant phoneme.

3. The method of claim 1 wherein the profile constructing step includes the steps of detecting the frequency distribution of the energy of the utterance for a plurality of time intervals within the duration of a single phoneme, and deriving at least a pair of sweep spectra representing the change in energy present in the phoneme from one frequency to another as a function of time for a plurality of frequency distributions, and wherein the difference profile generating step includes generating a pair of difference profiles for substantially each pair of significant phonemes by subtracting the respective sweep spectra of each significant phoneme from the respective sweep spectrum of each other significant phoneme.

4. The method of claim 3 wherein the sweep spectra deriving step includes deriving an upward sweep spectra representing the energy change from lower to higher frequencies as a function of time, and deriving a downward sweep spectrum representing the energy change from higher to lower frequencies as a function of time.

5. The method of claim 3 wherein the sweep spectra deriving step includes deriving a short time constant sweep spectrum having a first time constant, and deriving a long time constant sweep spectrum having a time constant longer than the first time constant.

6. The method of claim 1 wherein the profile constructing step comprises constructing a plurality of profiles based on different characteristics of each significant phoneme, and wherein the difference profile generating step includes generating a difference profile for each characteristic for substantially each pair of significant phonemes.

7. The method of claim 6 wherein the identifying step includes identifying more than one set of adjacent sections of the difference profiles which exceed positive and negative thresholds respectively for each phoneme pair.

8. The method of claim 7 wherein the computing step includes computing the likelihood that an unknown phoneme will be one or the other of a phoneme pair based on the relative area in the identified sets of sections of difference profile, and normalizing the likelihood computation for each set of sections, and wherein the choosing step includes choosing the more likely phoneme of each phoneme pair based on the cumulative relative area in the identified sets of sections of the profile of the unknown phoneme.

9. A method for recognizing speech containing a plurality of significant phonemes, said method comprising the steps of:
   uttering each of a plurality of significant phonemes;
   detecting the frequency distribution of the energy of the utterance for a plurality of time intervals within the duration of a single phoneme for each significant phoneme;
   deriving a plurality of energy spectra from the detected frequency distributions representing the energy present in each phoneme as a function of frequency;
   deriving at least a pair of sweep spectra from the detected frequency distributions for each phoneme representing the change of energy present in the phoneme from one frequency to another;

generating a set of different profiles for each pair of significant phonemes by subtracting the corresponding profile of each significant phoneme from the corresponding profile of the other significant phoneme;

identifying adjacent sections in the difference profiles of each set which exceed positive and negative thresholds respectively;

computing the likelihood that an unknown phoneme will be one or the other of a phoneme pair based on the relative areas in the identified sections of the difference profiles;

constructing equivalent spectra for a phoneme of an unknown utterance; and choosing the most likely phoneme of each phoneme pair based on the relative area in the identified sections of the spectra of the unknown phoneme.

10. The method of claim 9 wherein the energy spectra deriving step includes deriving short and long time constant energy spectra from the detected frequency distributions for each phoneme.

11. The method of claim 9 wherein the sweep spectra deriving step includes deriving a pair of short and long time constant sweep spectra respectively from the detected frequency distributions for each phoneme.

12. The method of claim 9 wherein the sweep spectra deriving step includes deriving upward and downward sweep respectively from the detected frequency distributions for each phoneme.

13. A method for processing a spoken utterance consisting of a sequence of phonemes said method comprising the steps of:

detecting the frequency distribution of the energy of the utterance for a plurality of time intervals within the duration of a single phoneme;

separating each frequency distribution into a plurality of frequency bandwidths;

deriving at least one energy spectrum representing the energy present in the phoneme as a function of frequency for a plurality of frequency distributions coverting a sequency of time intervals; and deriving at least a pair of sweep spectra representing the change in energy present in the phoneme from one frequency to another as a function of time for a plurality of frequency distributions, whereby the spoken phoneme can be represented by the energy spectrum and the sweep spectra to facilitate speech recognition.

14. The method of claim 13 and additionally comprising the step of separating each frequency distribution into a plurality of frequency bandwidths prior to said deriving steps.

15. The method of claim 13 wherein the sweep spectra deriving step includes deriving an upward sweep spectrum representing the energy change from lower to higher frequencies as a function of time, and deriving a downward sweep spectrum representing the energy change from higher to lower frequencies as a function of time.

16. The method of claim 13 wherein the sweep spectra deriving step includes deriving a short time constant sweep spectrum having a first time constant, and deriving a long time constant sweep spectrum having a time constant longer than the first time constant.

17. The method of claim 16 wherein the short time constant sweep spectrum deriving step includes deriving short time constant upward and downward sweep spectra representing the energy change from lower to higher and higher to lower frequencies respectively for a second time constant, and the long time constant sweep spectrum deriving step includes deriving long time constant upward and downward sweep spectra representing the energy change from lower to higher and higher to lower frequencies respectively for a time constant larger than the second time constant.

18. The method of claim 13 wherein the energy spectrum deriving step includes deriving a short time constant energy spectrum based on a first time constant, and deriving a long time constant energy spectrum based on a second time constant longer than the first time constant.

19. The method of claim 13 wherein the separating step includes dividing the detected energy into a plurality of frequency ranges, applying an automatic gain control to each frequency range independently, and separating the output of each automatic gain controller to separate pluralities of frequency bandwidths.

20. The method of claim 13 wherein the separating step includes passing the detected energy through a plurality of lowpass filters, and amplifying the output of adjacent lowpass filters with difference amplifiers to separate the detected energy into a plurality of frequency bandwidths.

21. The method of claim 20 wherein the sweep spectra deriving step includes passing the output of the difference amplifiers through respective upward and downward edge detectors which generate step functions of fixed amplitude and duration, and summing the step functions of adjacent sets of upward and downward edge detectors to generate upward and downward sweep spectra.

22. The method of claim 21 wherein the summing step includes summing the step functions of adjacent, overlapping sets of edge detectors.

23. The method of claim 20 wherein the energy spectrum deriving step includes passing the output of adjacent sets of difference amplifiers through a plurality of summing amplifiers, and summing the outputs of the summing amplifiers.

24. The method of claim 23 wherein the separating step includes isolating the energy at wavelengths higher than the highest said frequency bandwidth and separating that energy into a plurality of high frequency bandwidths, and the energy spectrum deriving step includes incorporating the energy from the high frequency bandwidths into the energy spectrum without passing through the summing amplifiers.

25. The method of claim 13 and additionally comprising the step of averaging the energy and sweep spectra of separate utterances of the same phoneme to derive profiles indicative of the phoneme.

26. The method of claim 25 and additionally comprising the steps of generating a difference profile for substantially each pair of phonemes by subtracting each profile of one phoneme from the equivalent profile of each pair phoneme, identifying adjacent sections of each difference profile which exceed positive and negative thresholds respectively, and computing the likelihood that an unknown phoneme will be one or the other of a phoneme pair based on the relative areas in the identified sections of the difference profiles.

27. The method of claim 26 and additionally comprising the steps of constructing equivalent profiles of a phoneme of an unknown utterance, and choosing the more likely phoneme of each phoneme pair based on the relative areas in the identified sections of the profiles of the unknown phoneme.

28. The method of claim 27 wherein the computing step includes computing the likelihood that an unknown phoneme will be one or the other of a phoneme pair based on the relative areas in the identified sets of sections of the difference profiles, normalizing the likelihood computation for each set of sections, and combining the normalized computations for each phoneme, and wherein the choosing step includes choosing the more likely phoneme of each phoneme pair based on the relative area in the identified sets of sections of the profiles of the unknown phoneme.

29. A method for processing a spoken utterance consisting of a sequence of phonemes, said method comprising the steps of:
   detecting the frequency distribution of the energy of the utterance for a plurality of time intervals within the duration of the phoneme;
   dividing the detected energy into a plurality of frequency ranges;
   applying an automatic gain control independently to the energy of each frequency range;
   separating the output of each automatic gain control into a plurality of frequency bandwidths;
   deriving a short time constant energy spectrum representing the energy present in the phoneme as a function of frequency for a plurality of frequency distributions covering a first sequence of time intervals;
   deriving a long time constant energy spectrum representing the energy present in the phoneme as a function of frequency for a plurality of frequency distributions covering a sequence of time intervals which is longer than the first time intervals;
   deriving short time constant upward and downward sweep spectra representing the change in energy present in the phoneme from a lower to a higher and a higher to a lower frequency respectively as a function of time for a plurality of frequency distributions covering a second time interval; and
   deriving long time constant upward and downward sweep spectra representing the change in energy present in the phoneme from a lower to a higher and a higher to a lower frequency respectively as a function of time for a plurality of frequency distributions covering a time interval longer than the second time interval,
   whereby the spoken phoneme can be represented by the energy spectrum and the sweep spectra to facilitate speech recognition.

30. The method of claim 29 wherein the separating step includes passing the detected energy through a plurality of low pass filters, and amplifying the output of adjacent low pass filters with difference amplifiers to separate the detected energy into a plurality of frequency bandwidths.

31. The method of claim 29 wherein the sweep spectra deriving steps each include passing the output of the difference amplifiers through respective upward and downward edge detectors which generates step functions of fixed amplitude and duration, and summing the step functions of adjacent sets of long time constant and short time constant upward and downward edge detectors to generate long time constant and short time constant upward and downward sweep spectra.

32. The method of claim 30 wherein the energy spectra deriving step includes passing the output of adjacent sets of difference amplifiers through a plurality of summing amplifiers, and summing the outputs of the summing amplifiers.

33. The method of claim 32 wherein the separating step includes isolating the energy at wave lengths higher than the highest frequency bandwidth of the low pass filters and separatiang that energy into a plurality of high frequency regions, and the energy spectrum deriving step includes incorporating the energy from the high frequency regions into the energy spectra without passing through the summing amplifiers.

34. The method of claim 29 and additionally and additionally comprising the step of averaging the energy and sweep spectra of separate utterances of the some phoneme to derive profiles indicative of the phoneme.

35. The method of claim 25 and additionally comprising the steps of generating a difference profile for substantially each pair of phonemes by subtracting each profile of one phoneme from the equivalent profile of each other phoneme, identifying adjacent sections of each difference profile which exceed positive and negative thresholds respectively, and computing the likelihood that an unknown phoneme will be one or the other of a phoneme pair based on the relative areas in the identified sections of the difference profiles.

36. The method of claim 35 and additionally comprising the steps of constructing equivalent profiles of a phoneme of an unknown utterance, and choosing the more likely phoneme of each phoneme pair based on the relative areas in the identified sections of the profiles of the unknown phoneme.

37. The method of claim 36 wherein the computing step includes computing the likelihood that an unknown phoneme will be one or the other of a phoneme pair based on the relative areas in the identified sets of sections of the difference profiles, normalizing the likelihood computation for each set of sections, and combining the normalized computations for each phoneme, and wherein the choosing step includes choosing the more likely phoneme of each phoneme pair based on the relative areas in the identified sets of sections of the profiles of the unknown phoneme.

38. A method for processing a spoken utterance consisting of a sequence of phonemes, said method comprising the steps of:
   detecting the frequency distribution of the energy of the utterance for a plurality of time intervals within the duration of a single phoneme;
   passing the detected energy through a plurality of lowpass filters;
   amplifying the output of adjacent lowpass filters with difference amplifiers to separate the detected energy into a plurality of frequency bandwidths;
   passing the output of the difference amplifiers to respective upward and downward edge detectors to generate step functions of fixed amplitude and duration;
   summing the step functions of adjacent, overlapping sets of upward and downward edge detectors respectively to generate upward and downward sweep spectra;
   passing the output of adjacent sets of difference amplifiers through a plurality of summing amplifiers; and
   summing the outputs of the summing amplifiers to generate at least one energy spectrum, whereby the spoken phoneme can be represented by the energy spectrum and the sweep spectra to facilitate speech recognition.

39. The method of claim 38 wherein the edge detector summing step includes summing separately the step functions of short time constant edge detectors and long time constant edge detectors respectively to generate short time constant and long time constant upward and downward sweep spectra.

40. The method of claim 38 wherein the summing amplifier summing step includes summing the outputs of the summing amplifiers for a first time interval and a second time interval longer than the first time interval to generate a short time constant energy spectrum and a long time constant energy spectrum.

41. The method of claim 38 and additionally comprising the steps of passing the energy and sweep spectra through an analog to digital converter, adding the spectra from a plurality of repetitions of the same phoneme in a digital computer, and storing the added spectra as profiles in the digital computer.

42. The method of claim 41 and additionally comprising the steps of generating a difference profile for substantially each pair of phonemes by subtracting each profile of one phoneme from the equivalent profiles of each other phoneme, identifying adjacent sections of each difference profile which exceed positive and negative thresholds respectively, and computing the likelihood that an unknown phoneme will be one or the other of a phoneme pair based on the relative areas in the identified sections of the difference profiles.

43. The method of claim 42 and additionally comprising the steps of constructing equivalent profiles of a phoneme of an unknown utterance, and choosing the more likely phoneme of each phoneme pair based on the relative areas in the identified sections of the profiles of the unknown phoneme.

44. The method of claim 43 wherein the computing step includes computing the likelihood that an unknown phoneme will be one or the other of a phoneme pair based on the relative areas in the identified sets of sections of the difference profiles, normalizing the likelihood computation for each set of sections, and combining the normalized computations for each phonemes, and wherein the choosing step includes choosing the more likely phoneme of each phoneme pair based on the relative areas in the identified sets of sections of the profiles of the unknown phoneme.

45. A method for deciphering speech comprising:
training a memory device by uttering each of several phonemes repeatedly, detecting the frequency distribution of each utterance of each phoneme for a plurality of time intervals, deriving at least one energy spectrum representing the energy present in the spoken phoneme as a function of frequency for a plurality of frequency distributions covering a sequency of time intervals, deriving at least a pair of sweep spectra representing the change in energy present in the phoneme from one frequency to another as a function of time for a plurality of frequency distributions, generating profiles representative of the energy and sweep spectra for each phoneme, and storing the profile in the memory device;
computing the likelihood that an unknown phoneme will be one or the other of a phoneme pair by generating a difference profile for substantially each pair of phonemes by subtracting the profile of each phoneme from the profile of each other phoneme, identifying adjacent sections of each difference profile which exceed positive or negative thresholds respectively, and generating a probability distribution based on the relative areas in the identified sections of the difference profiles; and
identifying the most likely phoneme in an unknown substance by comparing the relative areas in the identified sections of the profile of the unknown phoneme with the probability distributions of each phoneme pair.

46. Apparatus for processing a spoken utterance consisting of a sequence of phonemes, said apparatus comprising:
a microphone for converting the sonic energy of the utterance into an electric signal;
a plurality of filters which separate the energy in the electric signal into a plurality of frequency bandwidths;
a plurality of energy summing applifiers which sum the energy of adjacent bandwidths for a plurality of electric signals covering a sequency of time intervals to generate an energy spectrum representing the energy present in the phoneme;
a plurality of rise and fall edge detectors respectively which detect a movement of energy from the output of one filter to the output of an adjacent filter; and
down and up sweep summing amplifiers respectively which generate downsweep and upsweep spectra representing the change in energy present in the phoneme from one frequency to another as a function of time for a sequence of time intervals.

47. The apparatus of claim 46 wherein the filters are low pass filters, and additionally comprising a plurality of difference amplifiers which output an electrical signal representing the amount of energy present in each bandwidth to the energy summing amplifiers and the edge detectors.

48. The apparatus of claim 46 and additionally comprising an analog to digital converter for digitizing the energy spectrum and the sweep spectra, and digital processing means for adding a plurality of spectra for a given phoneme and developing profiles representative of that phoneme.

49. The apparatus of claim 46 and additionally comprising means for isolating the energy in the electrical signal above the wavelength of the highest of the filters, and means for adding the high frequency energy to the energy spectra without passing through the energy summing amplifiers.

50. Apparatus for processing a spoken utterance consisting of a sequence of phonemes, said apparatus comprising:
a microphone for converting the sonic energy of the utterance into an electric signal;
means for detecting the frequency distribution of the electric signal for a plurality of time intervals within the duration of a single phoneme;
means for separating the frequency distribution into a plurality of frequency bandwidths;
means for deriving at least one energy spectrum representing the energy present in the electric signal as a function of frequency for a plurality of frequency distributions covering a sequency of time intervals; and
means for deriving at least a pair of sweep spectra representing a change in energy in the electric signal from one frequency to another as a function of time for a plurality of frequency distributions.

51. The apparatus of claim 50 wherein the energy spectrum deriving means includes means for deriving a short time constant energy spectrum based on a first time constant, and means for deriving a long time constant energy spectrum based on a second time constant longer than the first time constant.

52. The apparatus of claim 50 wherein the sweep spectra deriving means includes means for deriving an upward sweep spectra representing the energy change from lower to higher frequencies as a function of time, and means for deriving a downward sweep spectra representing the energy change from higher to lower frequencies as a function of time.

53. The apparatus of claim 50 wherein the sweep spectra deriving means includes means for deriving a short time constant sweep spectrum having a first time constant, and means for deriving a long time constant spectrum having a time constant longer than the first time constant.

54. The apparatus of claim 50 wherein the sweep spectra deriving means includes means for deriving short time constant and long time constant upward and downward sweep spectra representing the energy change from lower to higher and higher to lower frequencies for first and relatively long second time constants.

55. The apparatus of claim 50 and additionally comprising means for digitizing the energy and sweep spectra, and means for adding the digitized energy and sweep spectra of separate utterances of the same phoneme to develop profiles indicative of the phoneme.

* * * * *

UNITED STATES PATENT AND TRADEMARK OFFICE
CERTIFICATE OF CORRECTION

PATENT NO. : 4,829,572
DATED : May 9, 1989
INVENTOR(S) : King-Leung Kong

It is certified that error appears in the above-identified patent and that said Letters Patent is hereby corrected as shown below:

Column 3 Line 2, Delete "FIG. 4" and insert therefor --FIG.14--

Column 5 Line 57, Delete "infrequency" and insert therefor --in frequency--

Column 6 Line 5, Delete "lont" and insert therefor --long--

Signed and Sealed this

Twentieth Day of March, 1990

Attest:

JEFFREY M. SAMUELS

Attesting Officer

Acting Commissioner of Patents and Trademarks